No. 701,976. Patented June 10, 1902.
H. WIDDOWSON.
BEEF HOLDER.
(Application filed Sept. 28, 1901.)

(No Model.)

WITNESSES
F. A. Stewart
F. F. Teller

INVENTOR
Harold Widdowson
BY
ATTORNEYS

UNITED STATES PATENT OFFICE.

HAROLD WIDDOWSON, OF HYDE, ENGLAND.

BEEF-HOLDER.

SPECIFICATION forming part of Letters Patent No. 701,976, dated June 10, 1902.

Application filed September 28, 1901. Serial No. 76,918. (No model.)

*To all whom it may concern:*

Be it known that I, HAROLD WIDDOWSON, a subject of the King of Great Britain, residing at Hyde, in the county of Cheshire, England, have invented certain new and useful Improvements in Beef-Holders, of which the following is a full and complete specification, such as will enable those skilled in the art to which it appertains to make and use the same.

The object of this invention is to provide improved means or devices for holding a beef or other animal while the latter is being skinned or dressed, a further object being to provide means or devices for these purposes which may be used on a floor or on the ground without being secured to the floor or ground, said means or devices being simple in construction and operation and comparatively inexpensive; and with these and other objects in view the invention consists in devices of the class specified and constructed as hereinafter described and claimed.

Figure 1:
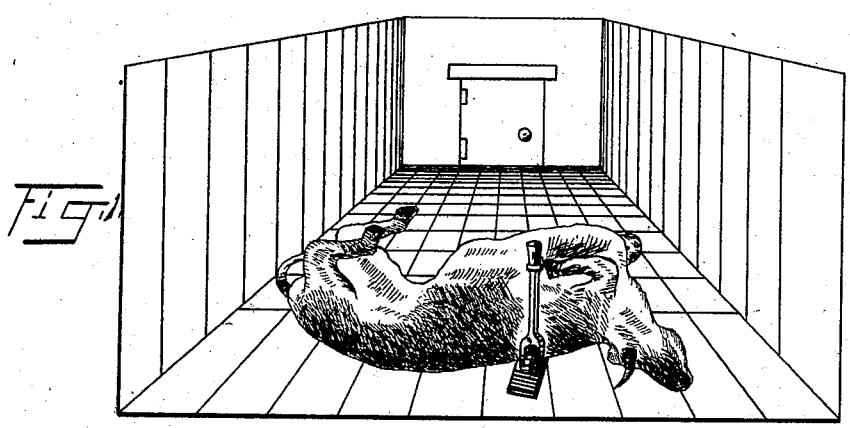
Figure 2:
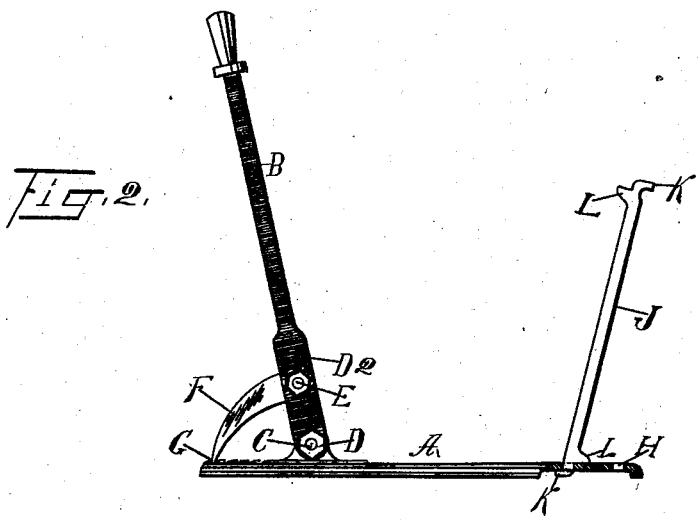

In the drawings forming part of this specification, in which the separate parts of my improvement are designated by the same reference characters in each of the views, Figure 1 is a view showing the operation of the device or devices which I employ; and Fig. 2, a side view of said device or devices connected as when in use, part of the construction being shown in section.

In the practice of my invention, reference being made to Fig. 2 of the accompanying drawings, I provide a flat plate or bar A of suitable length, which is provided at a predetermined distance from one end with a handle-lever B, which is slotted at one end and pivotally connected with a lug or projection D, formed on the plate or bar A, this connection being made by a bolt or pin C, and pivoted in the slot D², as shown at E, is a pawl F, which operates in transverse notches or recesses G, formed in the said end of the plate or bar A. The plate or bar A is provided at or near the opposite end with a plurality of openings H, and I also provide an attachable rod or bar J, which is provided, preferably at both ends and at one side, with a projecting tooth K and at the opposite side with a shoulder projection L, and said rod or bar J is adapted to be connected with the plate or bar A, as shown in Fig. 2, and to be held at an angle thereto. The handle-lever B may also be held at any desired angle with reference to the plate or bar A, as it will be readily understood, and the operation will be apparent from the foregoing description when taken in connection with the accompanying drawings and the following statement thereof, and said handle-lever is also detachable from said plate or bar.

In operating this apparatus or device a carcass of the beef or other animal is placed transversely of the plate or bar A, as shown in Fig. 1, or said plate or bar is passed beneath said carcass and the latter is turned against one of the supports formed by the handle lever or bar B and by the rod or bar J and is held in an inclined position by said rod or bar, while the side of said carcass opposite said support is skinned or dressed, after which the carcass is turned so as to rest in an inclined position against the opposite support, when the other side of said carcass may be skinned or dressed in the same manner as the first, and it will be understood that in either event the bar or support on the side on which the workman is operating may be lowered or removed, as will be readily understood.

This apparatus or device may be secured to a floor, if desired, or to the ground, and it will be apparent that changes in and modifications of the construction herein described may be made without departing from the spirit of my invention or sacrificing its advantages.

Having thus fully described my invention, what I claim as new, and desire to secure by Letters Patent, is—

1. The herein-described device comprising a plate or support and a plurality of bars or supplemental supports adapted to be connected therewith at or near its opposite ends and to be held in an inclined position, substantially as shown and described.

2. The herein-described device comprising a plate or support, a bar pivotally connected therewith at one end and adapted to be held in an inclined position and another bar adapted to be connected therewith at or near the opposite end and to be held in an inclined position, substantially as shown and described.

3. The herein-described device comprising a plate or support, a bar pivotally connected therewith adjacent to one end thereof and provided with a pivoted pawl operating in connection with transverse notches or recesses formed in said plate or support and another bar adapted to be connected with the plate or support at or near the opposite end and to be held in an inclined position, substantially as shown and described.

In testimony that I claim the foregoing as my invention I have signed my name, in presence of the subscribing witnesses, this 17th day of September, 1901.

HAROLD WIDDOWSON.

Witnesses:
THOMAS BARDSLEY,
EDWARD RICHARDS.